UNITED STATES PATENT OFFICE.

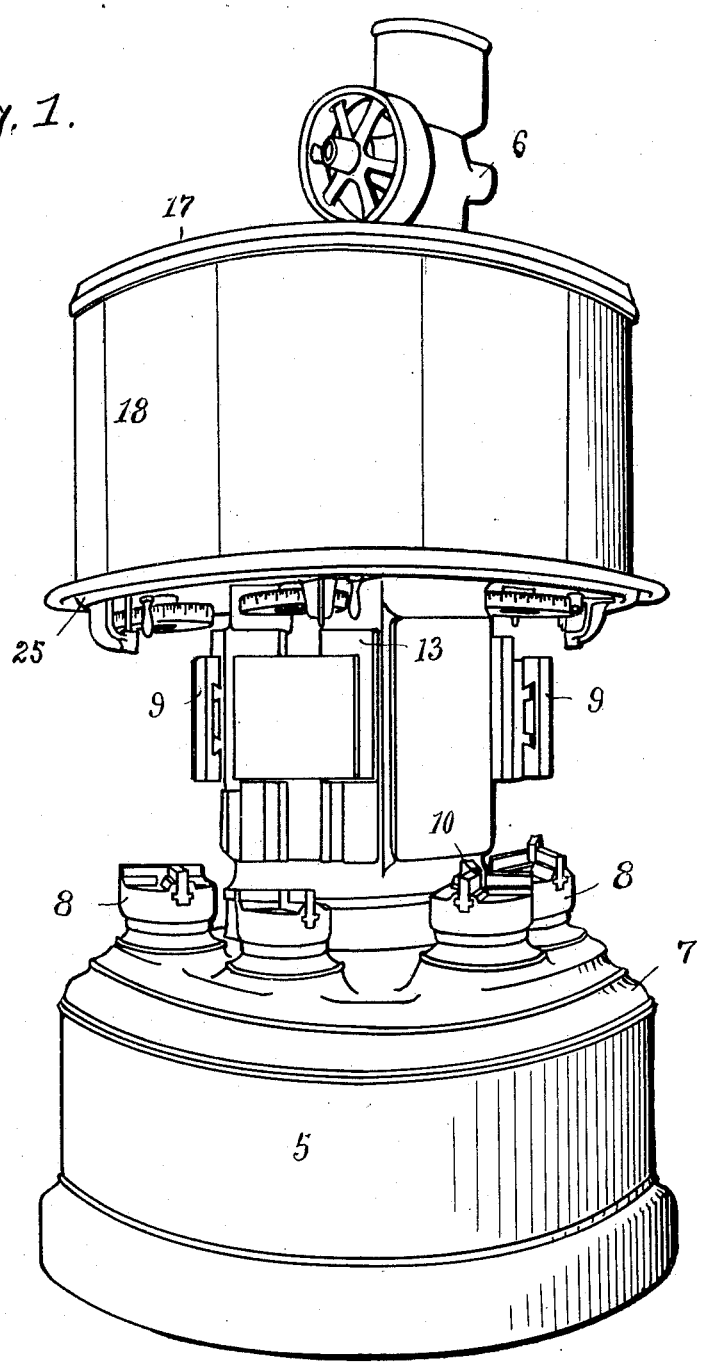

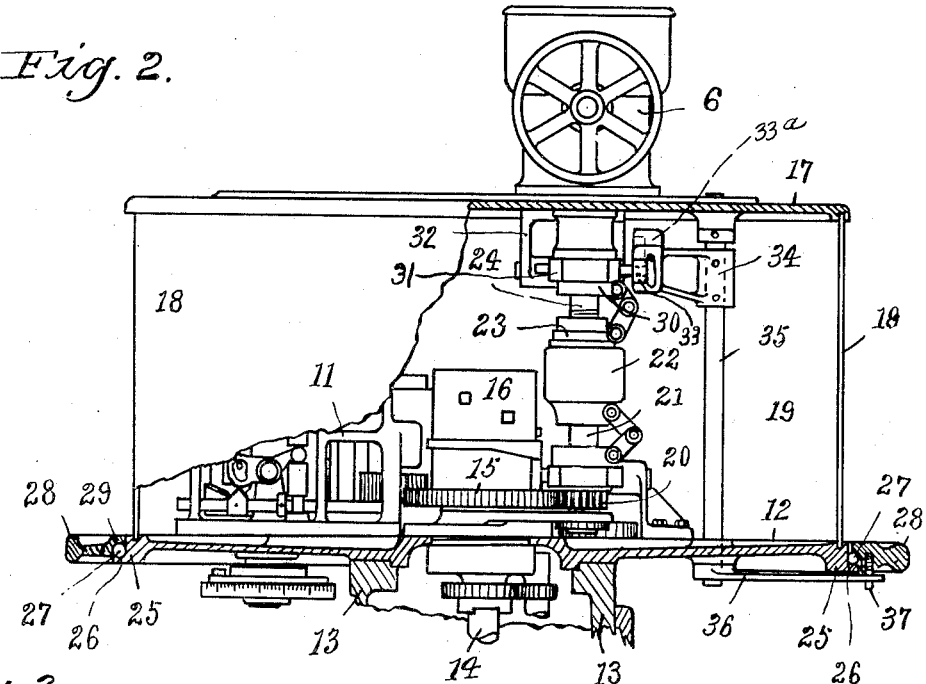

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

CONTROLLING MEANS FOR MACHINE-TOOLS.

1,382,340.   Specification of Letters Patent.   Patented June 21, 1921.

Application filed April 9, 1920. Serial No. 372,634.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Controlling Means for Machine-Tools, of which the following is a specification.

This invention relates to controlling means for large machine tools, whereby the same may be started or stopped from any side of the machine.

The improvement is shown applied to one of my multiple spindle machines, commercially known as a "Mult-Au-Matic" and as shown and described in my prior Patent #1,258,089. These machines are very large and in a sense represent six machines in one, each doing its own special job but all operating in unison, and driven from a single source of power through a clutch whereby the machine is started and stopped. They are attended by a single operator who is usually stationed in front of the machine, but who frequently has occasion to go around to the sides and in the back.

The object of the invention is to provide operative connections, for the clutch, which will be in reach of the operator from all sides of the machine, and whereby the clutch can be quickly thrown from any position around the machine wherever the operator may be standing; to design this clutch connection, in part, in the form of an encircling member that extends around on the outside of the machine and in position to be readily engaged for operation, and further to support this encircling member in ways so it can be slid backward and forward to engage and disengage the clutch with which it is connected.

The particular application of the invention as shown on the accompanying drawings includes as its encircling member, a ring which is supported on the upper portion of the machine within easy reach of the operator and is connected to operate the clutch through which the main shaft is driven from the motor positioned on the top of the machine. Other applications of the invention, however, such as mounting it around the lower portion of the machine in cases where by motor or any other driving medium is connected with the base are equally within the scope of my invention.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a perspective view of one of my multiple spindle machines having my improved form of controller, in ring form, applied thereto.

Fig. 2 shows a sectional elevation of the upper portion of the machine shown in Fig. 1, illustrating the ring controller, its ball bearings and supporting member in cross section together with its clutch connections, and Fig. 3 shows a sectional plan view of this same upper portion of the machine, showing the series of feed mechanisms connected and operated from a single shaft, and driven through a clutch, and inclosed by a cylindrical casing, and especially illustrating the controller ring for operating the clutch, as shown in the preceding figure.

I will first include a brief description of the important features of the Mult-Au-Matic machine and then describe the encircling controlling member as applied thereto.

5 represents the base of the machine which also serves to inclose and support the operating mechanism, not shown, but driven from the motor 6 for indexing the carrier 7 in which the six work carrying tables 8 are rotatably mounted. An intermittent movement is imparted to the carrier to successively move the same one-sixth of a rotation in a way to shift the tables from one station to another, in alinement with the five feed slides 9 positioned upon the tables and so that with each movement of the carrier one of the tables will be returned to the loading station described as 10 and over which no tool slide is positioned. A separate set of feed works 11 is provided for each tool slide, and as will be seen the feeds are mounted upon the floor plate 12 which in turn is supported on the upper end of the central column 13 of the machine. These feed works are circularly positioned, at suitable distances apart, around the central shaft 14 and are each connected to be operated from the central gear 15 and the drum 16 mounted on said shaft. The top plate 17 and the side plates 18 serve to inclose these feed works and form the inclosed chamber 19 before mentioned. The gear 15 upon the main shaft 14 is connected to be driven by a smaller gear 20 upon the driven shaft 21 operated through the clutch members 22 and 23, by the driving shaft 24 from the motor 6 before mentioned. From this it will be seen that while the machine is of a more or less complicated character and includes a number of duplicate sets of mechanisms, yet they are all operated as a unit and through the medium of a single drive which when started and stopped causes the starting and stopping of every movable part in the machine.

For the convenient application of my ring control I form an annular flange 25 upon the lower edge portion of the floor plate 12 and form in the outer walls thereof a raceway 26 in which a series of balls 27 are contained and serve to support the controller ring 28. This ring like the flange 25 is provided with an annular race way 29 to receive and cover the series of balls and so that the ring is free to be moved backward and forward upon the balls, when engaged at any point in its circumference around the machine.

The clutch before mentioned may be of the usual or any preferred construction so long as it includes a movable member that may be connected with and operated by a sleeve 30 adapted to be slid backward and forward by the yoke 31 pivoted in the hanger 32. This yoke bears a roll 33 which engages a cam groove 33ª in the face of the arm 34 mounted upon the vertical rocker shaft 35. The upper end of this rocker shaft is journaled in the top plate 17 and the lower end in the base plate 12, and upon its lower end is mounted an arm 36 whose outer end is pivotally connected to a pin 37 secured in the under side of the controller ring.

From the foregoing construction it will be apparent that each annular movement of the controller ring will carry with it the outer end of the arm 36 thereby rocking the shaft 35 and throwing its arms and clutch connections, to open or close the clutch according to the direction in which the ring has been moved. It will also be obvious that the ring may as readily be operated from one side of the machine as the other, and furthermore that the quick starting and stopping of the machine is made possible by this form of control.

Having thus described my invention, what I claim and desire to secure by Letters Patent is,

1. The combination with a machine tool including a clutch through which the same is driven, an annular support, a series of balls positioned therein, a controller ring mounted on the balls and support, and connections between the ring and clutch for operating the same.

2. A multiple spindle machine including a series of work tables positioned adjacent the several side portions of the machine, a driving shaft, a clutch member for the driving shaft, and controller mechanism encircling the machine, said controller mechanism connected in such manner that it may be slid in the direction of its circumference to operate the clutch.

3. The combination with a machine including a series of circularly arranged work units, a slidable controller member encircling the units, a rocker shaft and arm connections for the controller member to the driving means for the machine whereby the same may be readily started and stopped by sliding movements of the controller in the direction of its circumference.

4. In a multiple spindle machine, a clutch through which the machine is operated, a support encircling the machine, controller mechanism adapted to slide on the support, and connections between the controller mechanism and clutch for operating the clutch.

5. The combination with a machine tool including a clutch through which the same is driven, a support, a controller ring adapted to slide thereon, and connections between the ring and clutch for operating the clutch.

6. In a multiple spindle machine, a clutch through which the machine is operated, an annular support encircling the machine, a controller ring adapted to slide thereon, and connections between the ring and clutch for operating the clutch.

Signed at Bridgeport, in the county of Fairfield and State of Connecticut, this 30th day of March, A. D., 1920.

EDWARD P. BULLARD, Jr.

Witnesses:
W. J. Lynn,
John E. Cotter.